United States Patent
Di Vieste et al.

(10) Patent No.: US 11,898,482 B2
(45) Date of Patent: Feb. 13, 2024

(54) METHOD FOR THE DIAGNOSIS OF AN AIR SUPPLY CIRCUIT SUPPLYING AIR TO A BURNER OF AN EXHAUST GAS AFTER-TREATMENT SYSTEM FOR AN EXHAUST SYSTEM OF AN INTERNAL COMBUSTION ENGINE

(71) Applicant: MARELLI EUROPE S.P.A., Corbetta (IT)

(72) Inventors: Gaetano Di Vieste, Corbetta (IT); Luigi De Luca, Corbetta (IT); Fabio Sensi, Corbetta (IT); Giovanni Prodi, Corbetta (IT)

(73) Assignee: MARELLI EUROPE S.P.A., Corbetta (IT)

( * ) Notice: Subject to any disclaimer, the term of this patent is extended or adjusted under 35 U.S.C. 154(b) by 0 days.

(21) Appl. No.: 18/048,140

(22) Filed: Oct. 20, 2022

(65) Prior Publication Data

US 2023/0137631 A1 May 4, 2023

(30) Foreign Application Priority Data

Oct. 29, 2021 (IT) .................. 102021000027893

(51) Int. Cl.
*F01N 11/00* (2006.01)
*F01N 3/22* (2006.01)
(Continued)

(52) U.S. Cl.
CPC ........... *F01N 3/225* (2013.01); *F01N 3/2033* (2013.01); *F01N 3/32* (2013.01); *F01N 2550/14* (2013.01); *F01N 2900/1808* (2013.01)

(58) Field of Classification Search
CPC ...... F01N 3/025; F01N 3/0253; F01N 3/0256; F01N 3/2033; F01N 2240/14; F01N 2560/08

See application file for complete search history.

(56) References Cited

U.S. PATENT DOCUMENTS 5,353,590 A * 10/1994 Pettit .................. F01N 3/025
  60/303
5,634,330 A    6/1997 Achleitner et al.
(Continued)

FOREIGN PATENT DOCUMENTS

DE        4435196 C1   10/1995
DE    102010027987 A1  10/2011
DE    102010060136 A1   4/2012

OTHER PUBLICATIONS

Machine translation of DE102010060136A1, accessed Jan. 27, 2023. (Year: 2023).*

(Continued)

*Primary Examiner* — Jonathan R Matthias

(74) *Attorney, Agent, or Firm* — Howard & Howard Attorneys PLLC

(57) ABSTRACT

A method for the diagnosis of an air supply circuit supplying air to a burner of an exhaust gas after-treatment system for an exhaust system of an internal combustion engine, wherein the air supply circuit is provided with a pumping device housed along a first duct adjusted by a shut-off valve. The method entails housing a first pressure sensor along the first duct interposed between the pumping device and the burner; housing a second pressure sensor along a second duct out of the burner; acquiring the pressure signals detected by said first and second pressure sensors; and diagnosing faults and/or malfunctions in the air supply circuit depending on the pressure signals detected by said first and second pressure sensors.

11 Claims, 3 Drawing Sheets

(51) Int. Cl.
*F01N 3/20* (2006.01)
*F01N 3/32* (2006.01)

(56) References Cited

U.S. PATENT DOCUMENTS

| | | | |
|---|---|---|---|
| 2007/0157606 A1* | 7/2007 | Schenck Zu Schweinsberg | ......... F01N 3/36 60/303 |
| 2022/0136423 A1* | 5/2022 | Hemminger | ............ F01N 3/025 60/286 |

OTHER PUBLICATIONS

Search Report for Italian Patent Application No. 202100027893 dated Jun. 8, 2022.

\* cited by examiner

METHOD FOR THE DIAGNOSIS OF AN AIR SUPPLY CIRCUIT SUPPLYING AIR TO A BURNER OF AN EXHAUST GAS AFTER-TREATMENT SYSTEM FOR AN EXHAUST SYSTEM OF AN INTERNAL COMBUSTION ENGINE

CROSS-REFERENCE TO RELATED APPLICATIONS

This patent application claims priority from Italian patent application no. 102021000027893 filed on Oct. 29, 2021, the entire disclosure of which is incorporated herein by reference.

TECHNICAL SECTOR

The invention relates to a method for the diagnosis of an air supply circuit supplying air to a burner of an exhaust gas after-treatment system for an exhaust system of an internal combustion engine.

BACKGROUND ART

An internal combustion engine is typically provided with a number of cylinders, each connected to an intake manifold and to an exhaust manifold, to which an exhaust duct is connected in order to supply the exhaust gases produced by the combustion to an exhaust system, which releases the exhaust gases produced by the combustion into the atmosphere.

An exhaust gas after-treatment system usually comprises a pre-catalytic converter, which is arranged along the exhaust duct; a particulate filter, which is also arranged along the exhaust duct, downstream of the pre-catalytic converter; and a catalytic converter, which is arranged along the exhaust duct, upstream of the particulate filter.

The exhaust gas after-treatment system finally comprises, in addition, a burner. Inside the burner there is defined a combustion chamber, which receives fresh air from an air supply circuit and receives fuel from an injector, which is suited to inject fuel into the combustion chamber. Furthermore, a spark plug is coupled to the burner in order to ignite the mixture present inside the combustion chamber. The air supply circuit is typically provided with a pumping device, which draws from a tank, preferably with the interposition of an air filtering element, and supplies air to the burner by means of a duct adjusted by a shut-off valve.

The burner is suited to introduce exhaust gases (and, as a consequence, heat) into the exhaust duct in order to speed up the heating of the catalytic converter and so as to facilitate the regeneration of the particulate filter. In order to be able to control the combustion taking place inside the combustion chamber (and, as a consequence, the exhaust gases produced), it is extremely important that the quantity of air introduced by the air supply circuit can be controlled and that possible faults of the components, such as for example the pumping member or the adjustment valve, can promptly be recognized.

Document DE102010060136 discloses a method to control an air supply circuit supplying air to a burner of an exhaust gas after-treatment system for an exhaust system of an internal combustion engine. The supply circuit comprises a de Laval nozzle designed to keep the quantity of air supplied to the burner constant, regardless of the pressure variations that can occur in an exhaust duct of the exhaust system.

DESCRIPTION OF THE INVENTION

The object of the invention is to provide a method for the diagnosis of an air supply circuit supplying air to a burner of an exhaust gas after-treatment system for an exhaust system of an internal combustion engine, which does not suffer from the drawbacks described above and, in particular, is easy and economical to be implemented.

According to the invention there is provided a method for the diagnosis of an air supply circuit supplying air to a burner of an exhaust gas after-treatment system for an exhaust system of an internal combustion engine according to the appended claims.

BRIEF DESCRIPTION OF THE DRAWINGS

The invention will now be described with reference to the accompanying drawings showing a non-limiting embodiment thereof, wherein.

PREFERRED EMBODIMENTS OF THE INVENTION

Figure 1:
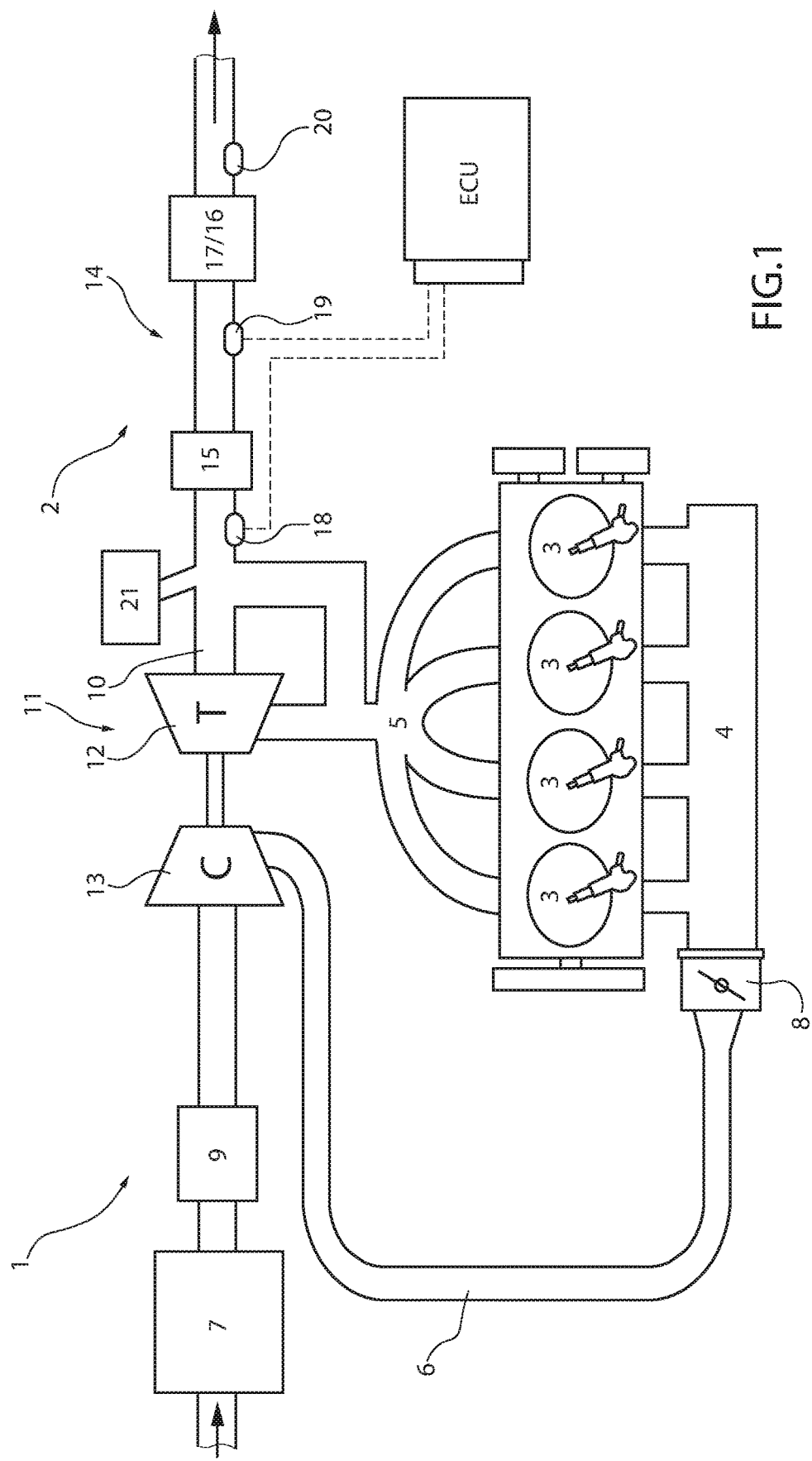
FIG. 1 schematically shows an internal combustion engine provided with an exhaust gas after-treatment system provided with a control unit implementing the diagnosis method according to the invention.

In FIG. 1, number 1 indicates as a whole a supercharged internal combustion engine provided with an exhaust system 2 (not shown) and having a number of cylinders 3, each connected to an intake manifold 4 and to an exhaust manifold 5 by means of at least one respective exhaust valve (not shown).

The intake manifold 4 receives a gas mixture comprising both exhaust gases and fresh air, i.e. air coming from the outside through an intake duct 6, which is provided with an air filter for the fresh air flow and is adjusted by a throttle valve 8. Along the intake duct 6, downstream of the air filter 7, there also is an air flow meter 9.

The exhaust manifold 5 is connected to an exhaust duct 10, which supplies the exhaust gases produced by the combustion to the exhaust system 2, which releases the gases produced by the combustion into the atmosphere.

The supercharged internal combustion engine 1 comprises supercharging system for the internal combustion engine 1 obtained by means of a turbocharger 11 provided with a turbine 12, which is arranged along the exhaust duct 10 so as to rotate at a high speed due to the action of the exhaust gases expelled from the cylinders 3, and a compressor 13, which is arranged along the intake duct 6 and is mechanically connected to the turbine 12 so as to be caused to rotate by the turbine 12 itself in order to increase the pressure of the air present in the supply duct 6.

The exhaust system 2 is provided with an exhaust gas after-treatment system 14 comprising a pre-catalytic converter 15 arranged along the exhaust duct 10, downstream of the turbocharger 11, and a particulate filter 16 (also known as Gasoline Particulate Filter) also arranged along the exhaust duct 10, downstream of the pre-catalytic converter 15. According to a preferred variant, the exhaust gas after-treatment system 14 is provided with a catalytic converter 17 arranged along the exhaust duct 10, upstream of the particulate filter 16. According to a preferred embodiment, the catalytic converter 17 and the particulate filter 16 are arranged one after the other on the inside of a common tubular container.

According to a first variant, the internal combustion engine 1 is further provided with a UHEGO or UEGO linear oxygen sensor 18 housed along the exhaust duct 10 and interposed between the turbocharger 11 and the pre-catalytic converter 15 to detect the air/fuel ratio of the exhaust gases (providing a liner output that indicates the content of oxygen in the exhaust gases) downstream of the turbocharger 11 and upstream of the pre-catalytic converter 15.

The internal combustion engine is further provided with a lambda sensor 19, which is suited to provide an on/off binary output, which indicates whether the air/fuel ratio of the exhaust gases is higher or lower than the stoichiometric value, is housed along the exhaust duct 10 and is interposed between the pre-catalytic converter 15 and the assembly defined by the catalytic converter 17 and the particular filter 16 in order to detect the concentration of oxygen in the exhaust gases downstream of the pre-catalytic converter 15; and, finally, a lambda sensor 20, which is suited to provide an on/off binary output, which indicates whether the air/fuel ratio of the exhaust gases is higher or lower than the stoichiometric value, is housed along the exhaust duct 10 and is arranged downstream of the assembly defined by the catalytic converter 17 and the particular filter 16 in order to detect the concentration of oxygen in the exhaust gases downstream of the assembly defined by the catalytic converter 17 and the particular filter 16.

The exhaust gas after-treatment system 14 further comprises a burner 21, which is suited to introduce exhaust gases (and, as a consequence, heat) into the exhaust duct 10 in order to speed up the heating of the pre-catalytic converter 15 and/or of the catalytic converter 17 and so as to facilitate the regeneration of the particulate filter 16. The burner 21 is arranged so as to introduce exhaust gases into the exhaust duct 10 upstream of the pre-catalytic converter 15 or downstream of the catalytic converter 17.

Figure 2:
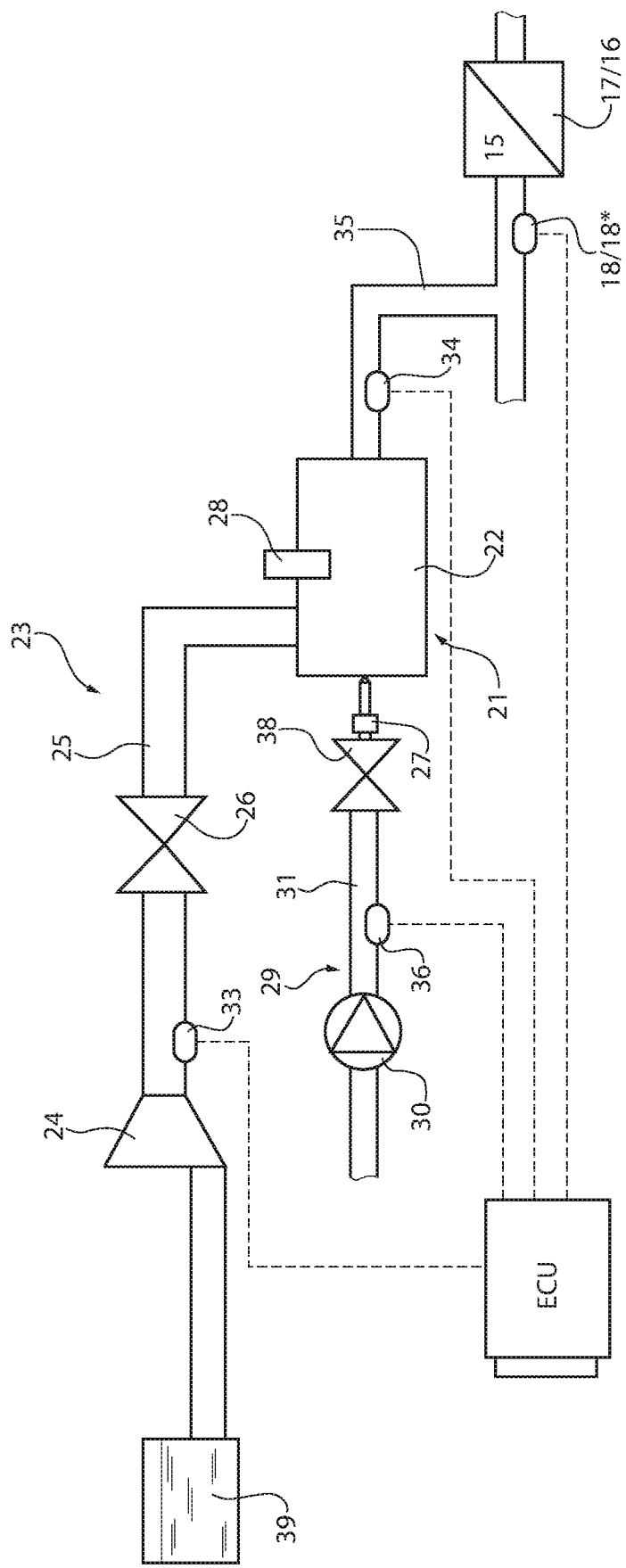
FIG. 2 schematically shows a detail of the exhaust gas after-treatment system shown in FIG. 1.

According to FIG. 2, inside the burner 21 there is defined a combustion chamber 22, which receives fresh air (i.e. air coming from the outside) through an air supply circuit 23, which is provided with a pumping device 24 (of the known kind and not described in detail) pumping from a tank 39, preferably with the interposition of an air filtering element, and supplies air to the burner 21 by means of a duct 25 adjusted by a shut-off valve 26 (arranged downstream of the pumping device 24).

The combustion chamber 22 further receives fuel from an injector 27, which is suited to inject fuel into the combustion chamber 22. Furthermore, a spark plug 28 is coupled to the burner 21 in order to ignite the mixture present inside the combustion chamber 22. The internal combustion engine 1 also comprises a fuel supply circuit 29 provided with a pumping device 30, which supplies fuel by means of a duct 31, which is adjusted by a valve 38.

The internal combustion engine 1 finally comprises a control system 32, which is designed to control the operation of the internal combustion engine 1. The control system 32 comprises at least one electronic control unit (also known as "ECU"), which controls the operation of the different components of the internal combustion engine 1. It is evident that the electronic control unit ECU disclosed in the description above can be a dedicated control unit ECU, which controls the operation of the burner 21, or can be the electronic control unit ECU controlling the operation of the internal combustion engine 1. The spark plug 28 is controlled by the electronic control unit ECU so as to generate a spark between its electrodes, thus determining the ignition of the gases compressed inside the combustion chamber 22. The control system 32 further comprises a plurality of sensors connected to the electronic control unit ECU.

The sensors comprise, in particular, a temperature and pressure sensor 33 for the air flow supplied to the burner 21, which is preferably housed along the duct 25 (in other words, the sensor 33 is housed along the duct 25 downstream of the pumping device 24, preferably interposed between the pumping device 24 and the shut-off valve 26); a temperature and pressure sensor 34 for the exhaust gases flowing out of the burner 21, which is housed along an outlet duct 35; a pressure sensor 36 for the fuel supplied to the burner 21, which is housed along the duct 31. The electronic control unit ECU is further connected to the UHEGO or UEGO linear oxygen sensor 18 and to the lambda sensors 19, 20, from which it receives signals indicative of the air/fuel ratio of the exhaust gases.

Figure 3:
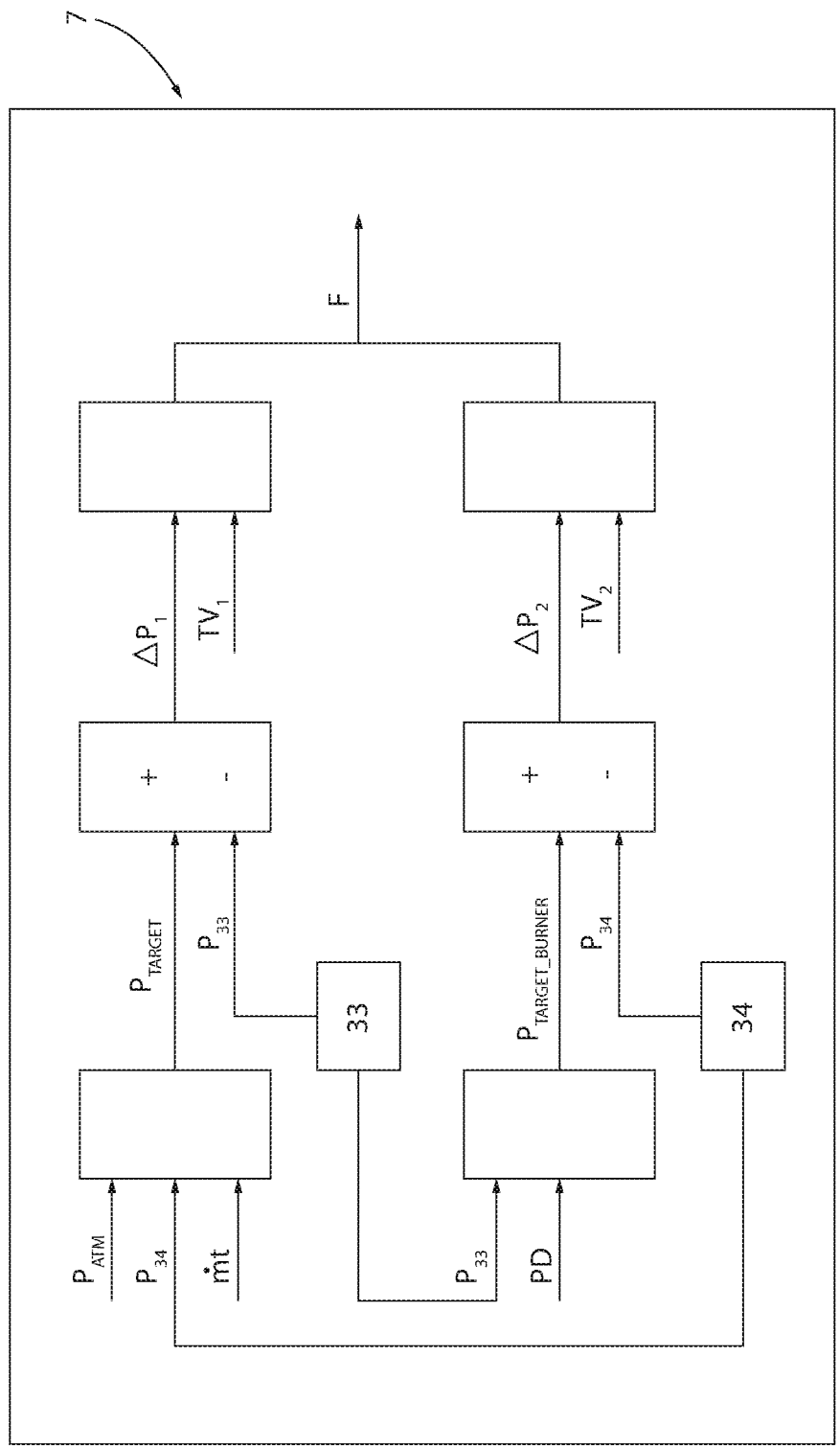
FIG. 3 is a block diagram showing the diagnosis method according to the invention.

The method implemented by the electronic control unit ECU in order to carry out a diagnosis of the correct operation of the air supply circuit 23 will be described below. Said method is at least partially and schematically shown in FIG. 3.

First of all, the electronic control unit ECU is designed to determine the target value $P_{TARGET}$ of the pressure downstream of the pumping device (24).

According to a preferred variant, the target value $P_{TARGET}$ of the pressure downstream of the pumping device 24 is determined through a calculation model, which processes a plurality of quantities, such as atmospheric pressure $P_{ATM}$, the pressure signal $P_{34}$ detected by the pressure sensor 34 out of the burner 21 along the outlet duct 35 and the target flow rate $\dot{m}_T$ through the supply circuit 23, in order to determine the target value $P_{TARGET}$ of the pressure downstream of the pumping device 24.

Then, the electronic control unit ECU is configured to acquire, by means of the sensor 33, the value $P_{33}$ of the pressure of the air flow supplied to the burner 21 along the duct 25 and to calculate the deviation $\Delta P_1$ between the target value $P_{TARGET}$ of the pressure downstream of the pumping device 24 and the value $P_{33}$ of the pressure of the air flow supplied to the burner 21 along the duct 25.

In a preliminary adjustment and set up phase, a safety limit value $TV_1$ is determined.

Finally, the electronic control unit ECU is configured to compare the deviation $\Delta P_1$ between the target value $P_{TARGET}$ of the pressure downstream of the pumping device 24 and the value $P_{33}$ of the pressure of the air flow supplied to the burner 21 along the duct 25 with the safety limit value $TV_1$ and to recognize a fault F, based on which an alarm signal F is sent in case said deviation $\Delta P_1$ is greater than the safety limit value $TV_1$.

In this case, possible faults and/or malfunctions of the pumping device 24 can be recognized, possible spills or leaks in the segment of the duct 25 from the pumping device 24 to the shut-off valve 26 can also be recognized and, finally, one can recognize when the shut-off valve 26 is locked in the open position.

In other words, a greater deviation $\Delta P_1$ than the safety limit value $TV_1$ can indicate a fault of the pumping device 24 or a leak in the segment of the duct 25 from the pumping device 24 to the shut-off valve 26 or that the shut-off valve 26 is locked in the open position (or a combination of the aforesaid faults).

The control strategy described above can be actuated only in case a few enabling conditions occur. More in detail the electronic control unit ECU s configured to check whether the pumping device 24 is working and whether the shut-off valve 26 is closed or open depending on the target (opening or closing) requested to the shut-off valve 26, which, in turn, is determined based on the target value $P_{TARGET}$ of the pressure downstream of the pumping device 24.

Then, the electronic control unit ECU is designed to determine the target value $P_{TARGET\_BURNER}$ of the pressure downstream of the burner 21.

According to a preferred embodiment, the target value $P_{TARGET\_BURNER}$ of the pressure downstream of the burner 21 is determined through a calculation model or a map stored in the electronic control unit ECU. In particular, the target value $P_{TARGET\_BURNER}$ of the pressure downstream of the burner 21 is determined starting from the value $P_{33}$ of the pressure upstream of the burner 21 detected by the sensor 33 and taking into account a variable flow resistance PD depending on the target air flow rate through the air supply circuit 23.

Then, the electronic control unit ECU is configured to acquire, by means of the sensor 34, the pressure value $P_{34}$ detected out of the burner 21 along the outlet duct 35 and to calculate the deviation $\Delta P_2$ between the target value $P_{TARGET\_BURNER}$ of the pressure downstream of the burner 21 and the pressure value $P_{34}$ detected by sensor 34 out of the burner 21 along the outlet duct 35.

In a preliminary adjustment and set up phase, a safety limit value $TV_2$ is determined.

Finally, the electronic control unit ECU is configured to compare the deviation $\Delta P_2$ between the target value $P_{TARGET\_BURNER}$ of the pressure downstream of the burner 21 and the pressure value $P_{34}$ detected by sensor 34 out of the burner 21 along the outlet duct 35 with the safety limit value $TV_2$ and to recognize a fault and/or malfunction F, based on which an alarm signal F is sent in case said deviation $\Delta P_2$ is greater than the safety limit value $TV_2$.

In this case, possible spills or leaks in the segment of the duct 25 from the shut-off valve 26 to the exhaust duct 10 can be recognized and one can recognize when the shut-off valve 26 is locked in the closed position.

In other words, a greater deviation $\Delta P_2$ than the safety limit value $TV_2$ can indicate a leak in the segment of the duct 25 from the shut-off valve 26 to the exhaust duct 10 or that the shut-off valve 26 is locked in the closed position (or a combination of the two faults mentioned above).

In this case, again, the control strategy described above can be actuated only in case a few enabling conditions occur. More in detail, the electronic control unit ECU is configured to check whether the pumping device 24 is working and whether the shut-off valve 26 is open.

As it is known, the pumping device 24 is provided with an actuator device. During the normal operation, the electronic control unit ECU controls the actuator device with a command characterized by a frequency and a control amplitude that are variable in time. Therefore, considering that the pumping device 24 is supplied with an oscillating command characterized by a frequency and a control amplitude that are variable in time, the Applicant found out that the pressure values downstream and upstream of the burner 21 (detected by means of the sensors 33 and 34) have a development that is similar to the development of the control command of the pumping device 24. In other words, the Applicant found out that the frequency content of the pressure signals acquired by the pressure sensors 33 and 34 have a development that is similar to the development of the control command of the pumping device 24 (namely, an oscillating development which is characterized by a frequency and a control amplitude that are variable in time and is similar to the development of the control command of the pumping device 24).

Hence, according to a further embodiment, the electronic control unit ECU is designed to analyse the frequency content of the signals acquired by the pressure sensors 33 and 34.

More in detail, the frequency content of the signal acquired by the pressure sensor 33 is compared with an expected development, which is determined based on the development of the control command of the pumping device 24. In case the deviation of the frequency content of the signal acquired by the pressure sensor 33 from the expected development is greater than a safety value, a possible fault and/or malfunction F of the pumping device 24 is recognized or a leak in the segment of the duct 25 from the pumping device 24 to the shut-off valve 26 is recognized.

In other words, a deviation of the frequency content of the signal acquired by the pressure sensor 33 from the expected development that is greater than a safety value indicates a fault and/or malfunction F of the pumping device 24 or a leak in the segment of the duct 25 from the pumping device 24 to the shut-off valve 26 (or a combination of the two faults mentioned above).

Furthermore, the frequency content of the signal acquired by the pressure sensor 34 is also compared with an expected development, which is determined based on the development of the control command of the pumping device 24. In case the deviation of the frequency content of the signal acquired by the pressure sensor 34 from the expected development is greater than a safety value, a leak in the segment of the duct 25 from the shut-off valve 26 to the exhaust duct 10 is recognized.

If, on the other hand, the signal acquired by the pressure sensor 34 has a substantially constant development and, at the same time, the deviation of the frequency content of the signal acquired by the pressure sensor 33 from the expected development is smaller than or equal to the safety value, a fault of the shut-off valve 26, which is stuck in the closed position, is diagnosed.

It is evident that the further embodiment that was just described can be operated alternatively to the first embodiment or in combination with it. In this last case, the embodiment that was just described is used by the electronic control unit ECU to check and validate the diagnosis made with the first embodiment concerning the operation of the shut-off valve 26 and of the pumping member 24 or possible leaks in the duct 25 and vice versa.

LIST OF REFERENCE NUMBERS 1 internal combustion engine
2 exhaust system
3 cylinders
4 intake manifold
5 exhaust manifold
6 intake duct
7 air filter
8 throttle valve
9 air flow meter
10 exhaust duct
11 turbocharger
12 turbine
13 compressor
14 after-treatment system
15 pre-catalytic converter
16 particulate filter 17 catalytic converter
18 linear sensor
19 lambda sensor
20 lambda sensor
21 burner
22 combustion chamber
23 air supply circuit
24 pumping device
25 duct
26 shut-off valve
27 injector
28 spark plug
29 fuel supply circuit
30 pumping device
31 duct
32 control system
33 P, T sensor
34 P, T sensor
35 outlet duct
36 P, T sensor
38 valve
39 air tank
ECU electronic control unit
$P_{TARGET}$ target pressure value
$P_{33}$, $P_{34}$ pressure value detected by the sensor 33, 34
$\dot{m}_T$ target air flow rate
$\Delta P_1$, $\Delta P_2$ deviation
$TV_1$, $TV_2$ safety limit value
$P_{TARGET\_BURNER}$ target pressure value
PD flow resistance

The invention claimed is:

1. A method for the diagnosis of an air supply circuit (23) supplying air to a burner (21) of an exhaust gas aftertreatment system (14) for an exhaust system (2) of an internal combustion engine (1) having an exhaust duct (10); the system (14) comprises at least one catalytic converter (15, 17) arranged along the exhaust duct (10) and the burner (21) is suited to introduce exhaust gases into the exhaust duct (10) to speed up the heating of said at least one catalytic converter (15, 17); wherein inside the burner (21) there is defined a combustion chamber (22), which receives fuel from an injector (27) and fresh air through an air supply circuit (23), which is provided with a pumping device (24) housed along a first duct (25) adjusted by a shut-off valve (26); the method comprises the steps of:

housing a first pressure sensor (33) along the first duct (25) interposed between the pumping device (24) and the burner (21);

housing a second pressure sensor (34) along a second duct (35), which connects the burner (21) to the exhaust duct (10);

acquiring pressure signals ($P_{33}$, $P_{34}$) detected by said first and second pressure sensors (33, 34);

determining a target value ($P_{TARGET\_BURNER}$) of the pressure downstream of the burner (21);

calculating a second deviation ($\Delta P_2$) through the difference between said target value ($P_{TARGET\_BURNER}$) of the pressure downstream of the burner (21) and the value ($P_{34}$) of the pressure of the air flow flowing out of the burner (21), which is detected by the second sensor (34); and recognizing a fault and/or malfunction (F), based on which an alarm signal is sent in case said second deviation ($\Delta P_2$) is greater than the second safety value ($TV_2$).

2. The diagnosis method according to claim 1, wherein the target value ($P_{TARGET\_BURNER}$)) of the pressure downstream of the burner (21) is determined starting from the value of the pressure upstream of the burner (21) and taking into account a variable pressure drop depending on a target air flow rate through the air supply circuit (23).

3. The diagnosis method according to claim 1, wherein, in case said second deviation ($\Delta P_2$) is greater than the second safety value ($TV_2$), a spill in the segment of the first duct (25) from the shut-off valve (26) to the exhaust duct (10) is recognized and when the shut-off valve (26) is locked in the closed position is recognized.

4. A method for the diagnosis of an air supply circuit (23) supplying air to a burner (21) of an exhaust gas aftertreatment system (14) for an exhaust system (2) of an internal combustion engine (1) having an exhaust duct (10); the system (14) comprises at least one catalytic converter (15, 17) arranged along the exhaust duct (10) and the burner (21) is suited to introduce exhaust gases into the exhaust duct (10) to speed up the heating of said at least one catalytic converter (15, 17); wherein inside the burner (21) there is defined a combustion chamber (22), which receives fuel from an injector (27) and fresh air through an air supply circuit (23), which is provided with a pumping device (24) housed along a first duct (25) adjusted by a shut-off valve (26); the method comprises the steps of:

housing a first pressure sensor (33) along the first duct (25) interposed between the pumping device (24) and the burner (21);

housing a second pressure sensor (34) along a second duct (35), which connects the burner (21) to the exhaust duct (10);

acquiring pressure signals ($P_{33}$, $P_{34}$) detected by said first and second pressure sensors (33, 34);

calculating a third deviation between a frequency content of the signal acquired by the first sensor (33) and an expected development; wherein the expected development is determined based on a development of a control command of the pumping device (24); and recognizing a fault and/or malfunction (F), based on which an alarm signal is sent in case said third deviation is greater than a third safety value.

5. The diagnosis method according to claim 4, wherein, in case said third deviation is greater than the third safety value, a fault of the pumping device (24) is recognized or a spill in the segment of the first duct (25) from the pumping device (24) to the shut-off valve (26) is recognized.

6. The diagnosis method according to claim 4, wherein, in case the signal acquired by the second sensor (34) has a substantially constant development and said third deviation is smaller than or equal to the third safety value, a malfunction of the shut-off valve (26) is detected, since it is locked in the closed position.

7. A method for the diagnosis of an air supply circuit (23) supplying air to a burner (21) of an exhaust gas aftertreatment system (14) for an exhaust system (2) of an internal combustion engine (1) having an exhaust duct (10); the system (14) comprises at least one catalytic converter (15, 17) arranged along the exhaust duct (10) and the burner (21) is suited to introduce exhaust gases into the exhaust duct (10) to speed up the heating of said at least one catalytic converter (15, 17); wherein inside the burner (21) there is defined a combustion chamber (22), which receives fuel from an injector (27) and fresh air through an air supply circuit (23), which is provided with a pumping device (24) housed along a first duct (25) adjusted by a shut-off valve (26); the method comprises the steps of:

housing a first pressure sensor (33) along the first duct (25) interposed between the pumping device (24) and the burner (21);

housing a second pressure sensor (34) along a second duct (35), which connects the burner (21) to the exhaust duct (10);

acquiring the pressure signals ($P_{33}$, $P_{34}$) detected by said first and second pressure sensors (33, 34);

calculating a fourth deviation between a frequency content of the signal acquired by the second sensor (34) and an expected development; wherein the expected development is determined based on a development of a control command of the pumping device (24); and recognizing a fault (F), based on which an alarm signal is sent in case said fourth deviation is greater than a fourth safety value.

8. The diagnosis method according to claim 7, wherein, in case said fourth deviation is greater than the fourth safety value, a spill in the segment of the first duct (25) from the shut-off valve (26) to the exhaust duct (10) is recognized.

9. A method for the diagnosis of an air supply circuit (23) supplying air to a burner (21) of an exhaust gas aftertreatment system (14) for an exhaust system (2) of an internal combustion engine (1) having an exhaust duct (10); the system (14) comprises at least one catalytic converter (15, 17) arranged along the exhaust duct (10) and the burner (21) is suited to introduce exhaust gases into the exhaust duct (10) to speed up the heating of said at least one catalytic converter (15, 17); wherein inside the burner (21) there is defined a combustion chamber (22), which receives fuel from an injector (27) and fresh air through an air supply circuit (23), which is provided with a pumping device (24) housed along a first duct (25) adjusted by a shut-off valve (26); the method comprises the steps of:

housing a first pressure sensor (33) along the first duct (25) interposed between the pumping device (24) and the burner (21);

housing a second pressure sensor (34) along a second duct (35), which connects the burner (21) to the exhaust duct (10);

acquiring pressure signals ($P_{33}$, $P_{34}$) detected by said first and second pressure sensors (33, 34);

determining a target value ($P_{TARGET}$) of the pressure downstream of the pumping device (24);

calculating a first deviation ($\Delta P_1$) through the difference between said target value ($P_{TARGET}$) and the value ($P_{33}$) of the pressure of the air flow supplied to the burner (21), which is detected by the first sensor (33); and recognizing a fault and/or malfunction (F), based on which an alarm signal is sent in case said first deviation ($\Delta P_1$) is greater than the first safety value ($TV_1$).

10. The diagnosis method according to claim 9, wherein the target value ($P_{TARGET}$) of the pressure downstream of the pumping device (24) is determined through a calculation model depending on a plurality of characteristic quantities comprising atmospheric pressure ($P_{ATM}$), the pressure signal ($P_{34}$) detected by the second pressure sensor (34) and the target flow rate ($\dot{m}_T$) through the supply circuit (23).

11. The diagnosis method according to claim 10, wherein, in case said first deviation ($\Delta P_1$) is greater than the first safety value ($TV_1$), a fault of the pumping device (24) is recognized, a spill in the segment of the first duct (25) from the pumping device (24) to the shut-off valve (26) is recognized and when the shut-off valve (26) is locked in the open position is recognized.

* * * * *